United States Patent [19]

Englander et al.

[11] Patent Number: 5,769,379
[45] Date of Patent: Jun. 23, 1998

[54] MIRROR STRUT WITH BRIDGING ELEMENT

[75] Inventors: Sol Englander; Benjamin Englander, both of Jamaica, N.Y.

[73] Assignee: Rosco Inc., New York, N.Y.

[21] Appl. No.: 807,657

[22] Filed: Feb. 27, 1997

[51] Int. Cl.⁶ .................................................. A47F 7/14
[52] U.S. Cl. ........................................ 248/475.1; 359/871
[58] Field of Search .................................. 248/475.1, 466, 248/476; 359/871, 879

[56] References Cited

U.S. PATENT DOCUMENTS

| | | | |
|---|---|---|---|
| 4,368,868 | 1/1983 | Urban | 248/475.1 X |
| 4,441,682 | 4/1984 | Su | 248/475.1 |
| 4,747,679 | 5/1988 | Beach, Jr. | 248/476 X |

*Primary Examiner*—Ramon O. Ramirez
*Attorney, Agent, or Firm*—Ostrolenk, Faber, Gerb & Soffen, LLP

[57] ABSTRACT

A strut assembly for supporting an external element (for example, a mirror) to the body of a vehicle includes a plurality of strut portions, a first strut portion of which is operatively coupled to the external element and a second strut portion of which is operatively coupled to a portion of the vehicle body, and a support bracket operatively engaging, at a first end thereof, both the portion of the vehicle body and the second strut portion and, at a second end thereof, the frame of the vehicle such that vibrations of the external element are reduced.

6 Claims, 2 Drawing Sheets

MIRROR STRUT WITH BRIDGING ELEMENT

BACKGROUND OF THE INVENTION

1. Field of the Invention

The present invention relates to strut assemblies and, more particularly, to strut assemblies which support external elements to vehicles, for example, mirrors for viewing remote areas around the vehicles.

2. Related Art

It is known to provide vehicles with rear view and side view mirrors to enable a driver to see various areas around the vehicle. In some cases, the vehicle is used to transport small children and, therefore, requires special mirrors for viewing atypical areas around the vehicle, for example, the lower front area of the vehicle. By providing a downwardly directed and forwardly disposed mirror, it is possible to insure that no children are present in front of the vehicle before the driver moves the vehicle forward.

Unfortunately, not all manufacturers of vehicles offer special mirrors as stock or optional equipment. Therefore, a retrofit action is required to install such special mirrors onto stock vehicles used to, for example, transport children.

Moreover, when forwardly disposed and downwardly directed special mirrors are required as described above, vehicle vibrations becomes a critical issue particularly when a retrofit action is required. This is so because on some vehicles the front fenders to which these mirrors are mounted are ill-equipped to receive the struts which support the special mirrors and, therefore, the mirrors tend to vibrate at unacceptable levels. Specifically, the struts which are used to support the mirror must couple to the stock vehicle at one or more locations. Unfortunately, it is generally required to connect at least one strut to a portion of the sheet metal body at the front fenders of the vehicle which does not have adequate support to the vehicle frame to prevent vibration of the mirror.

Accordingly there is a need in the art for a strut assembly which is capable of supporting a mirror on a vehicle in a retrofit application and which reduces (dampens) the vibrations in the mirror to acceptable levels.

SUMMARY OF THE INVENTION

In order to overcome the problems in the art described above, as well as other problems, the strut assembly of the preferred embodiment of the present invention includes a plurality of strut portions, including a first strut portion which is operatively coupled to an external element (for example, a mirror) and a second strut portion which is operatively coupled to a portion of the vehicle body, and a support bracket operatively engaging, at a first end thereof, both the portion of the vehicle body and the second strut portion and, at a second end thereof, the frame of the vehicle such that vibrations of the external element are reduced.

It is noted that the external element may be a camera, a spot light, a fog light, a loud speaker or the like without departing from the scope of the invention.

Other features and advantages of the present invention will become apparent from the following description of the invention which refers to the accompanying drawings.

BRIEF DESCRIPTION OF THE DRAWINGS

For the purpose of illustrating the invention, there is shown in the drawings a form which is presently preferred, it being understood, however, that the invention is not limited to the precise arrangement and instrumentality shown.

DETAILED DESCRIPTION OF THE INVENTION

Figure 1:
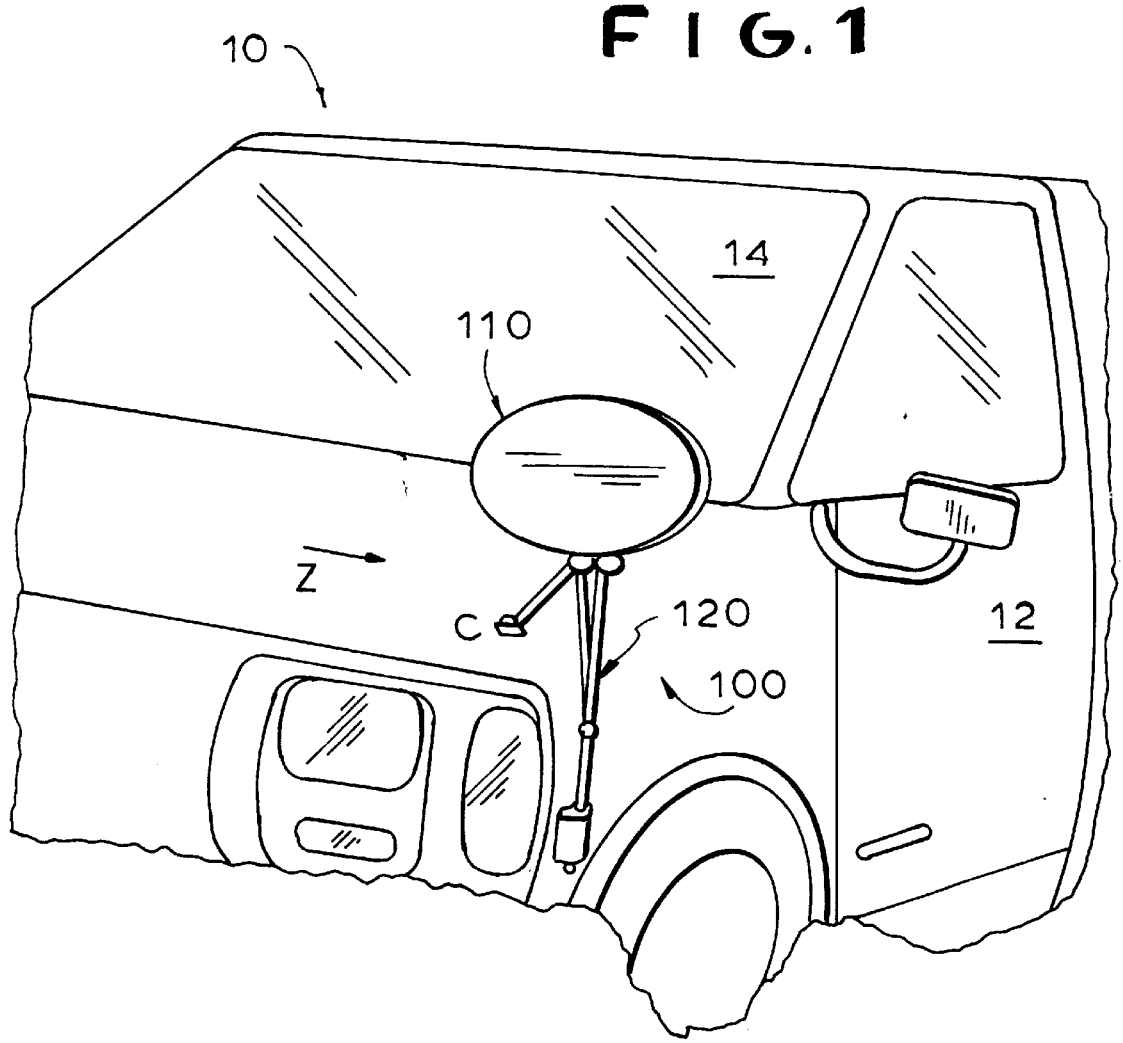
FIG. 1 is a perspective view of the strut assembly of the preferred embodiment of the present invention coupled to the body of a vehicle.

Referring now to the drawings wherein like numerals indicate like elements, there is shown in FIG. 1 the front portion of a vehicle 10 on which a strut assembly 100 is mounted. The strut assembly 100 includes struts 120 which connect to the vehicle at points A, B and C (point B is not visible in FIG. 1). The strut assembly is also connected to a mirror 110 and supports same in a position which is desired by a driver.

It is preferred that the mirror 110 be generally round and convex such that a wide viewing area is obtained. It is also preferred that the struts 120 be arranged such that the mirror 110 be oriented generally downward and that the mirror 110 be disposed generally forward of the vehicle 10. As such, a driver may readily see the lower front area of the vehicle and determine whether children are present before moving forward. It is understood that different types of mirrors 110 may be employed and that the mirror 110 may be disposed at other locations of the vehicle and still be within the scope of the present invention.

Figure 2:
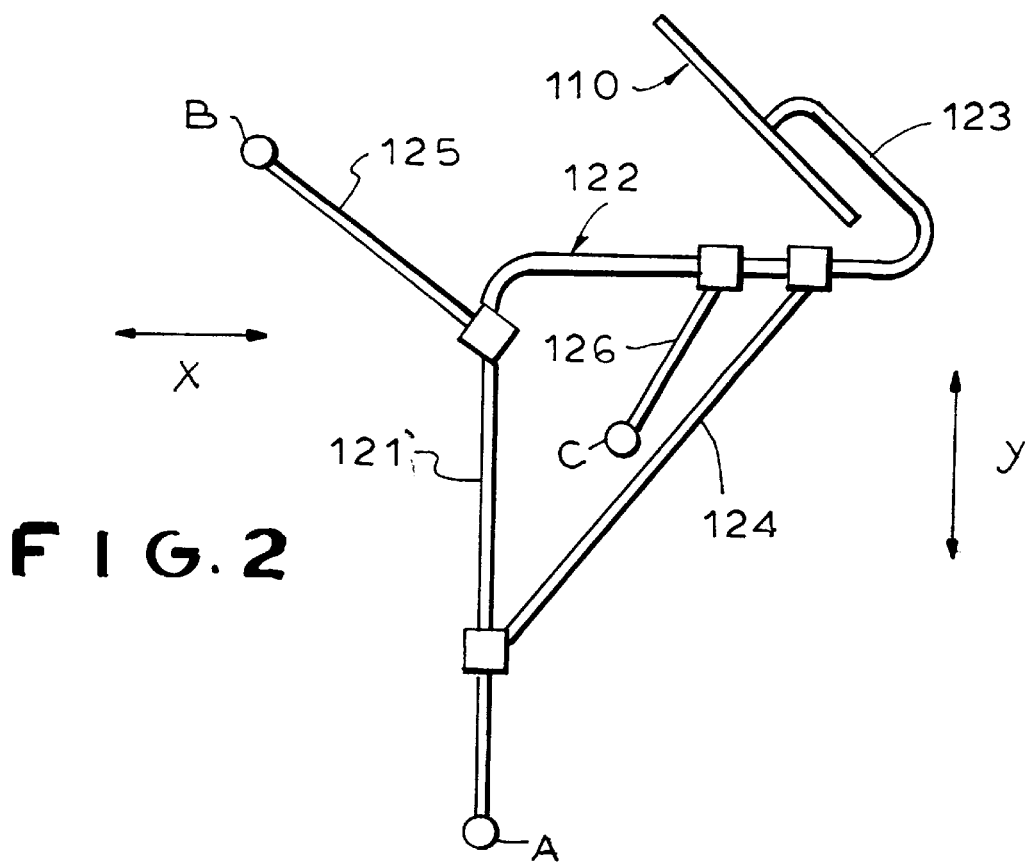
FIG. 2 is a side schematic view of the strut assembly of FIG. 1 from the direction z.

With reference to FIGS. 1 and 2, the connection of the strut assembly 100 to the vehicle 10 is described. FIG. 2 is a side schematic view of the strut assembly 100 from direction "z" in FIG. 1. As shown, the struts 120 include strut portions 121–126 where strut portions 121, 125 and 126 are connected to the vehicle 10 at points A, B and C, respectively.

It is appreciated that strut elements 121, 122, 123, 124 and 125 all lie in generally the same plane. Accordingly, strut element 124 reduces the relative movement between strut elements 121 and 122 in the direction indicated by the letter "y" in FIG. 2. Thus, vibrations in the mirror 110 are reduced when the strut 121 is mounted to the vehicle 10 at point A.

It should be appreciated that strut element 125 couples strut elements 121 and 122 to the vehicle 10 at point B, where point B is on or near the lip of the left front quarter panel 12 adjacent the windshield 14 (FIG. 1). Accordingly, strut element 125 reduces the relative movement between the vehicle 10 and strut elements 121 and 122 in the direction indicated by the letter "x" in FIG. 2. Thus, vibrations in the mirror 110 are further reduced.

The strut assembly 100 is further coupled to the vehicle 10 via strut portion 126 which is mounted to the left front quarter panel 12 at point C. It is noted that strut portion 126 is not in the same general plane as the other strut elements and, therefore, reduces relative movement of the strut assembly 100 in a direction indicated by the letter "z" in FIG. 1, which direction is generally perpendicular to directions x and y.

It is noted that the majority of stock vehicles do not come equipped with support structures under the sheet metal body of the left front quarter panel 12 (FIG. 1) at point C. As a result, coupling the strut portion 126 to the vehicle at point C has only marginally acceptable results in reducing mirror vibrations. Stock vehicles 10 likewise do not come equipped with support structures under the sheet metal body of the right front quarter panel 16 (not shown) at a point D corresponding to point C shown in FIG. 1.

Figure 4:
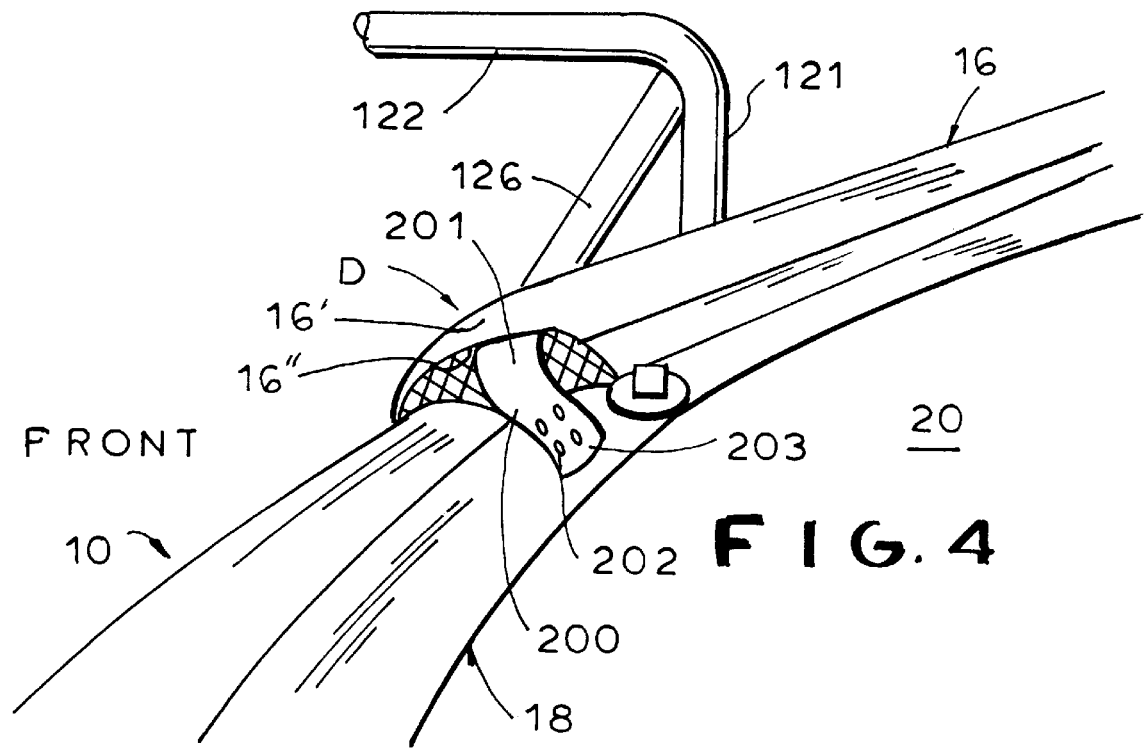
FIG. 4 is a perspective view of the support bracket of FIG. 3 in use on the vehicle.

Reference is now made to FIG. 4 which is a perspective view of the right front quarter panel (fender) 16 of the vehicle 10 as seen from inside the motor compartment 20. A strut assembly 100 having strut portions 122, 121 and 126 is mounted to the right front quarter panel 16 in substantially the same way as described above with respect to the left quarter panel 12.

Strut portion 126 is mounted to the vehicle 10 at point D. A front portion of the vehicle frame 18 is shown to which the right front fender is mounted. In accordance with the preferred embodiment of the present invention, a support bracket 200 is included which operatively couples and bridges the portion D of the front quarter panel 16 to the vehicle frame 18. Thus, the support bracket 200 sufficiently stiffens the sheet metal body of the vehicle 10 at point D to adequately reduce vibrations in the mirror 110. More specifically, the fender 16 has an exterior surface 16' and an interior surface 16". The support bracket 200 has a curved portion 201 which reaches to and engages the interior surface of the fender 16, at a point juxtaposed to the exterior point D on the fender 16. The other end 203 of the support bracket 200 is rigidly attached to the vehicle frame 18.

Figure 3:
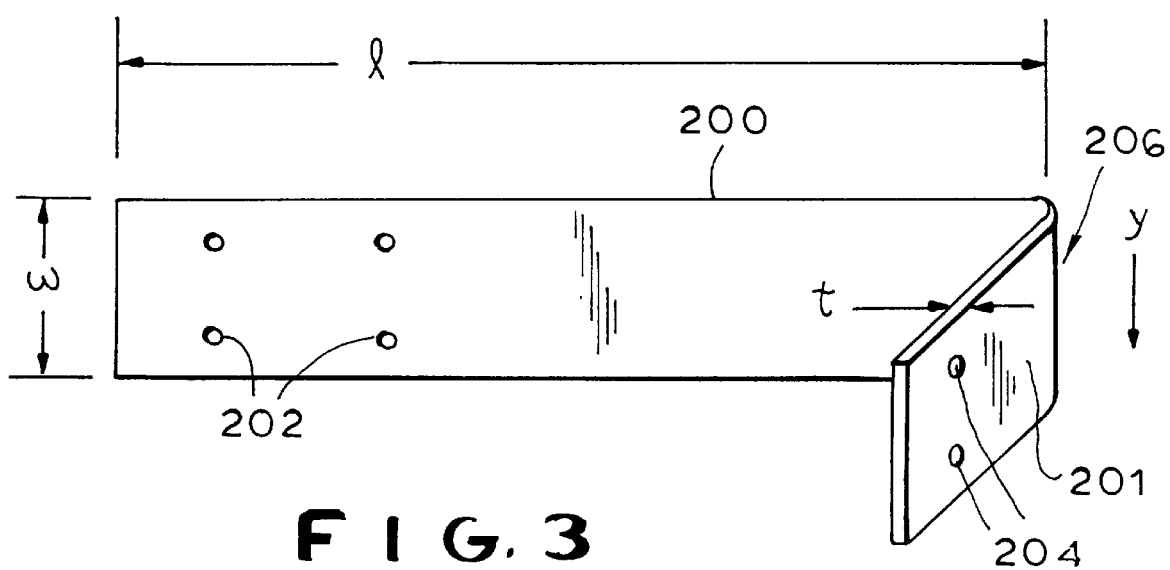
FIG. 3 is a top view of the support bracket of the preferred embodiment of the present invention.

FIG. 3 shows a top view of the support bracket 200 in more detail. The support bracket 200 is formed of a substantially rigid material, for example, steel, aluminum, plastic or the like. The support bracket 200 is preferably substantially rectangularly shaped and includes a compound bend 206 which is formed by bending one end of the bracket 200 upward (in a direction perpendicular to the arrow "y") and simultaneously downward (in the direction of the arrow "y"). The compound bend 206 enables the support bracket 200 to operatively engage both the sheet metal body of the vehicle 10 at point D and the vehicle frame 18.

The support bracket is further provided with mounting holes 202 which permit the bracket to be mounted to the vehicle frame 18 via bolts, rivets or the like. The bracket 200 is also provided with holes 204 for permitting operative coupling to both the body of the vehicle 10 and the strut portion 126 of the strut assembly 100. It is preferred that the support bracket 200 have a length of about 5 inches, a width of about 1 inch and a thickness of about ⅛ inch.

It can be appreciated that the strut support 100 of the preferred embodiment of the present invention provides a means for the retrofitable coupling of a mirror to the body of a vehicle which reduces vibrations in the mirror and, therefore, provides for a superior view of, for example, the lower front region of a vehicle for carrying children such that safe operation of the vehicle may be obtained.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A strut assembly for supporting a mirror to the body of a vehicle, comprising:

a plurality of strut portions, a first strut portion which is operatively coupled to the mirror and a second strut portion of which is operatively coupled to a predetermined location on an exterior surface of a front fender of the vehicle; and a support bracket for damping vibrations of the mirror, the support bracket operatively engaging, at a first end thereof, both an interior surface of the front fender at a location juxtaposed to the predetermined location of the vehicle and the second strut portion, the support bracket operatively engaging at a second end thereof, a frame of the vehicle and at least one fastener passing through the front fender and connecting the second strut portion and the support bracket.

2. The strut assembly of claim 1, wherein the strut assembly includes:

at least two strut portions which are coupled to the body of the vehicle and lie in substantially the same plane; and a third strut portion, not in the same plane as the at least two strut portions, which is coupled to both the body of the vehicle and the first end of the support bracket.

3. The strut assembly of claim 1, wherein the first end of the support bracket includes a compound bend for operatively engaging the body of the vehicle and the second strut portion.

4. The strut assembly of claim 3, wherein the support bracket is formed of a rigid material.

5. The strut assembly of claim 4, wherein the support bracket is formed of steel.

6. The strut assembly of claim 3, wherein the support bracket is substantially rectangular and has a length of about 5 inches, a width of about 1 inch and a thickness of about ⅛ inch.

* * * * *